United States Patent [19]
Sato

[11] 3,713,373
[45] Jan. 30, 1973

[54] APPARATUS FOR RELEASING THE SHUTTER DRIVING MECHANISM OF A PHOTOGRAPHIC CAMERA TO OBTAIN LONG EXPOSURE TIME

[75] Inventor: Akihiko Sato, Tokyo, Japan
[73] Assignee: Nippon Kogaku K.K., Tokyo, Japan
[22] Filed: June 23, 1971
[21] Appl. No.: 155,880

[30] Foreign Application Priority Data

June 30, 1970 Japan .................................. 45/64441

[52] U.S. Cl. .................................. 95/53 R, 95/53.6
[51] Int. Cl. .......................... G03b 9/62, G03b 9/64
[58] Field of Search ........................... 95/53 R, 53.6

[56] References Cited

UNITED STATES PATENTS 3,357,332  12/1967  Helber et al. ........................ 95/53 R
3,276,342  10/1966  Rentschler et al. ................... 95/53 R

FOREIGN PATENTS OR APPLICATIONS 1,225,043  9/1966  Germany .......................... 95/53 R Primary Examiner—Samuel S. Matthews
Assistant Examiner—Russell E. Adams, Jr.
Attorney—Raymond J. McElhannon et al.

[57] ABSTRACT

Apparatus for releasing the shutter driving mechanism of a photographic camera to obtain long exposure time when the camera shutter is set at a B-position having a manually operable shutter release button, a manually operable self-timer, interlocking members movable between an upper position in which the shutter driving mechanism remains charged and a lower position in which the shutter driving mechanism starts exposure and starts the self-timer, the interlocking means being biased towards its upper position and movable to its lower position by the shutter release button, a second shutter release member mounted in the self-timer to release the engagement of the interlocking members with the shutter release button for allowing the interlocking members to move to their upper position to complete the exposure when the set time has elapsed.

5 Claims, 7 Drawing Figures

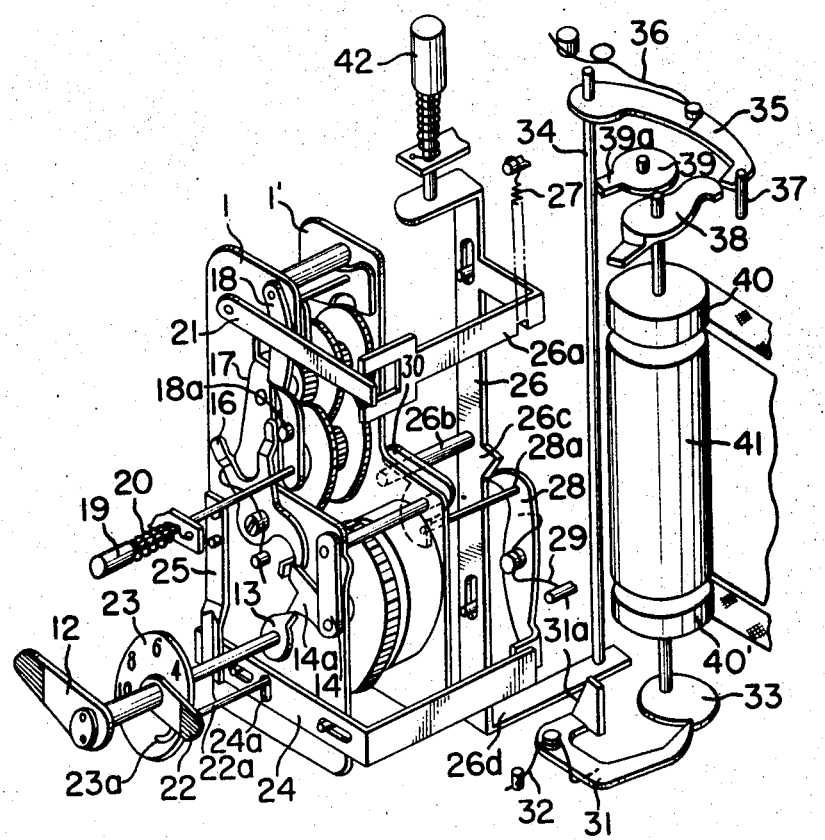

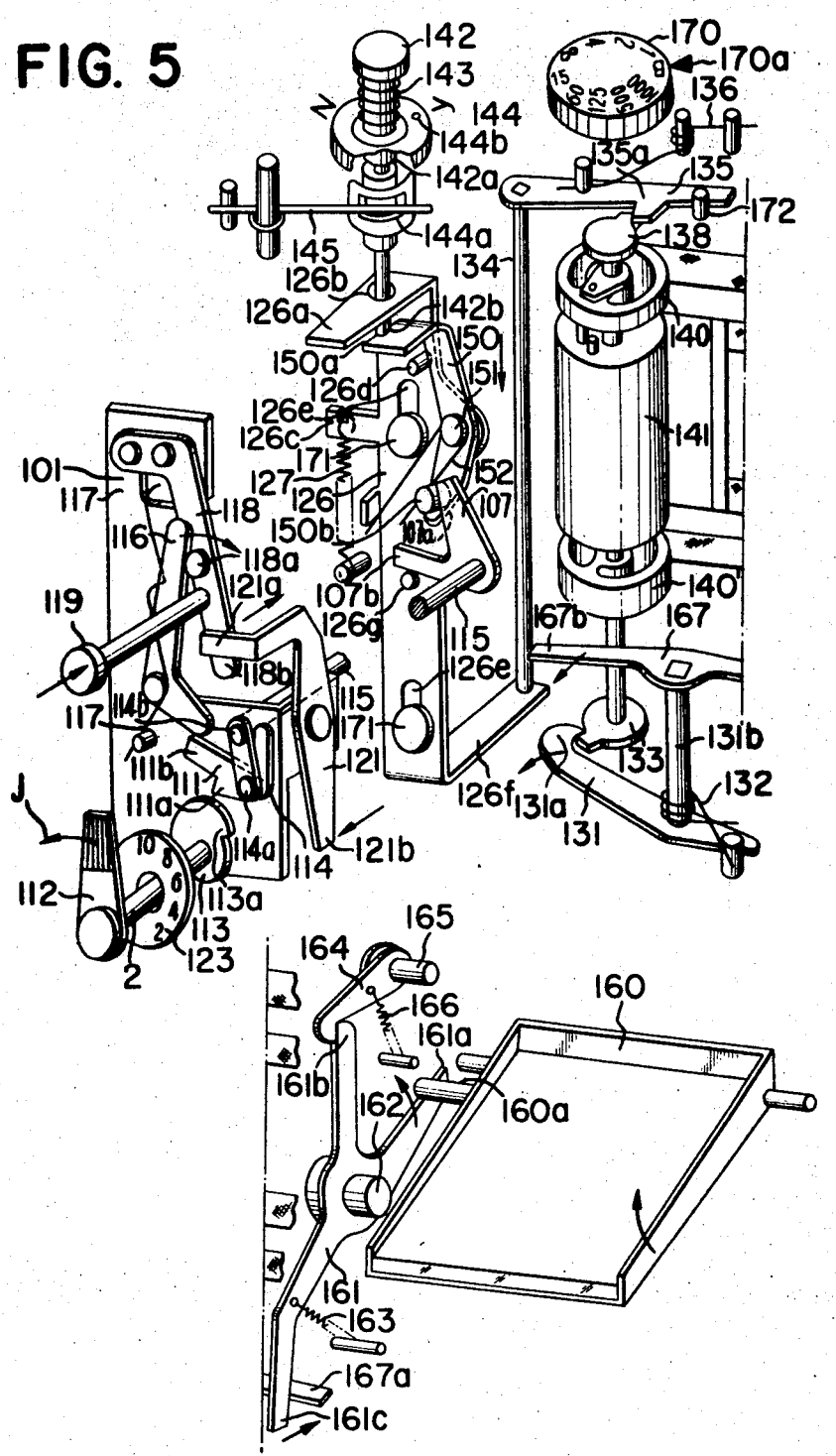

APPARATUS FOR RELEASING THE SHUTTER DRIVING MECHANISM OF A PHOTOGRAPHIC CAMERA TO OBTAIN LONG EXPOSURE TIME

BACKGROUND OF THE INVENTION

1. Field of the Invention

This invention relates to a time exposure device for effecting long exposures from about 2 to several tens of seconds by using a self-timer employed with a single lens reflex camera.

2. Description of the Prior Art

In a single lens reflex camera provided with a self-timer, a shutter release button and an interlocking member engageable with the shutter release button to retain a rear curtain upon depression of the shutter release button against a biasing force imparted thereto and actuate a lever for upwardly moving a mirror, it is known to employ a time exposure device of the type described. In such a device, it is ideally desirable that the release of the front curtain and the release of the self-timer should take place at the same time. Nevertheless, the device is such that the release of the front curtain and of the self-timer is effected in accordance with the distance over which the interlocking member, associated with the shutter release button, is lowered with the depression of the shutter release button, and this involves great difficulties in adjusting the timing for starting such release actions. Also, the time exposure device of the known type is arranged so that the rear curtain is never released as long as the shutter release button is depressed; however, in some instances the shutter button is released immediately after the depression thereof, and in other instances the shutter button is left depressed and unreleased for a relatively long time. In the latter cases, the shutter button may remain depressed for a time even longer than the set time of the self-timer, thereby preventing an accurate exposure from being accomplished.

SUMMARY OF THE INVENTION

The present invention seeks to provide, in a single lens reflex camera of the type described above, a time exposure device which has eliminated the above-mentioned drawbacks existing in the prior art device.

To achieve such an object, the time exposure device of the present invention comprises an auxiliary lever pivotally mounted on the interlocking member and adapted to be engaged by the shutter release button. Lock means, which may include a knob and a spring, are provided for urging the shutter release button in the direction to engage said auxiliary lever and holding the shutter release button in depressed position. A lever is pivotally mounted on a shaft for retaining a front curtain, and on the same shaft, a lever is mounted to interlock a lever for starting the self-timer with a lever for driving the mirror. Thus, the mirror driving lever releases the front curtain and starts the self-timer, and the engagement between the shutter release button and the auxiliary lever is released by a shutter release lever provided adjacent to the self-timer and adapted to operate when any set time of the self-timer is elapsed.

BRIEF DESCRIPTION OF THE DRAWINGS

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein:

FIG. 2 is a view similar to FIG. 1 and showing the parts in position wherein the self-timer has been set to a superslow shutter speed;

FIG. 5 is a perspective view of the time exposure device according to an embodiment of the present invention;

DESCRIPTION OF THE PREFERRED EMBODIMENT

For a better understanding of the present invention, description will first be made of the time exposure device according to the prior art, as shown in FIGS. 1 to 4.

Figure 1:
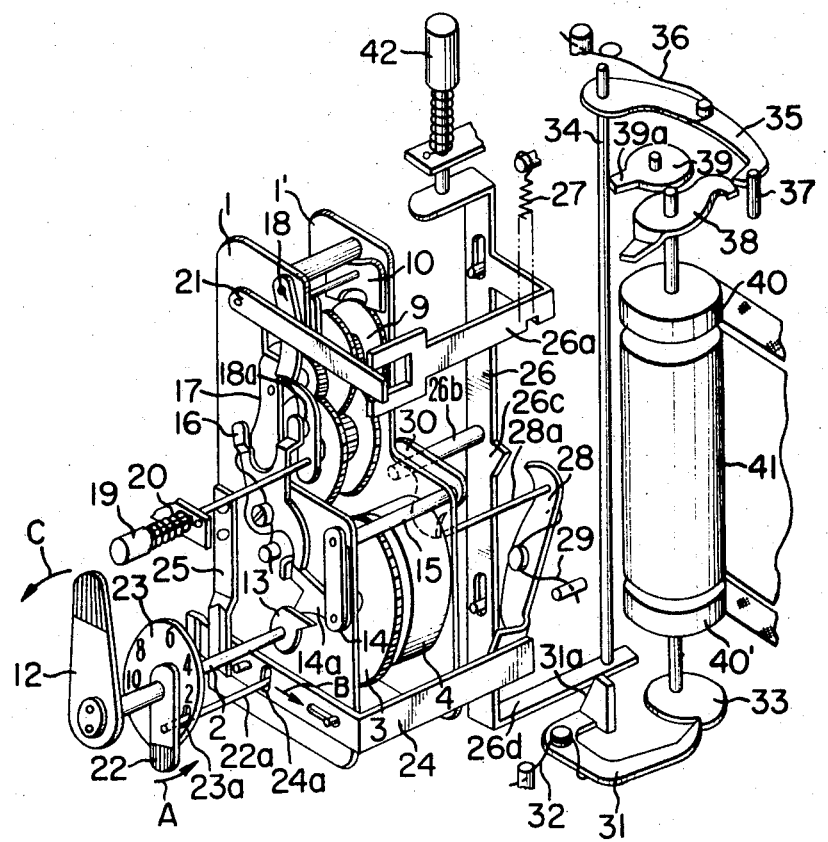
FIG. 1 is a perspective view of a time exposure device using a self-timer according to the prior art.
Figure 4:
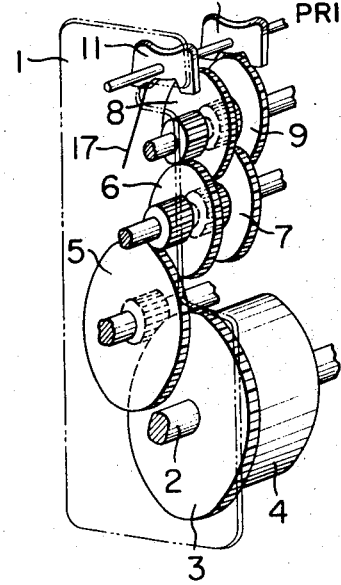
FIG. 4 is a perspective view of the self-timer.
Figure 3:
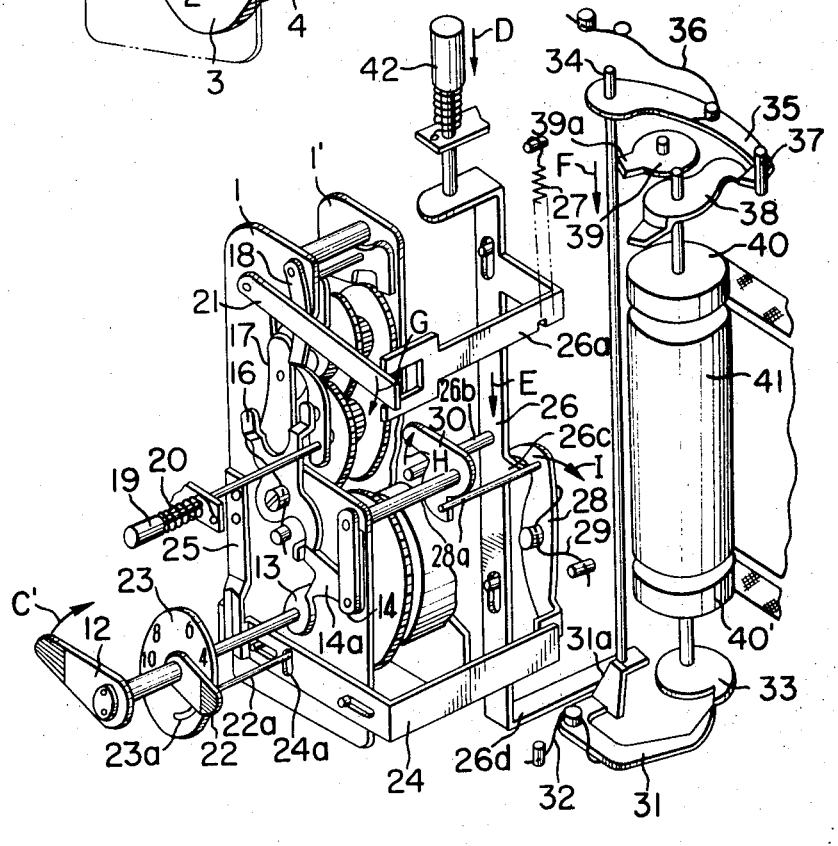
FIG. 3 is also a view similar to FIG. 1, but showing the parts in position wherein the shutter release button has been released.

Referring to FIGS. 1, 2 and 3, reference numerals 1 and 1' designate the base plates of the self-timer device which are secured to a camera body (not shown) and through which extend a rotary shaft 2. Mounted on the rotary shaft 2 between the base plates 1 and 1' are a main gear 3 and a spiral spring 4 having one end thereof secured to the rotary shaft 2 and the other end secured to a fixed portion of the camera, as best seen in FIG. 4. Also between the base plates 1 and 1', there are rotatably supported intermediate gears 5, 6, 7, 8 and an escape wheel 9; and an ankle 10 and a brake member 11 are mounted on a common shaft extending between the plates 1 and 1'. A self-timer 12 and a cam plate 13 are secured to the rotary shaft 2 outwardly of the base plate 1. An interlocking lever 14 is secured to a shaft 15 rotatably journalled to the base plates 1 and 1', and having an interlocking member 14a pivotally mounted at one end thereof for engaging the cam plate 13 and a limit lever 16. The limit lever 16 is pivotally connected to the base plate 1 and is normally biased clockwise by a spring 17. The cam surface of the plate 13 is so-contoured that when the plate is rotated counterclockwise, the limit lever 16 is also rotated counterclockwise with the aid of the interlocking member 14a, and the spring 17 will bias the brake member 11 counter-clockwise to engage the ankle 10 with the escape wheel 9 so as to prevent reverse rotation of the cam plate 13 and accordingly of the self-timer lever 12, while the limit lever 16 is restrained from clockwise rotation by a retaining pin 18a studded in a plate spring 18. The plate spring 18 has one end thereof secured to the base plate 1 and is normally positioned to retain the limit lever 16 by means of the retaining pin 18a. Reference numeral 19 designates a start button normally biased by a spring 20 in the direction toward the exterior of the camera body (not shown). The start button 19 is so-arranged that when it is depressed, the plate spring 18 is pushed thereby to release the limit lever 16 from its retained position.

A release lever 21 is pivotally mounted on the base plate 1 in the upper portion thereof in such a manner as to deflect the plate spring 18 in response to the release action of a shutter release button interlocking member 26 (later described) to thereby release the limit lever 16. A self-timer lever 22 is pivotally mounted on the shaft 2 between the self-timer 12 and the cam plate 13, and has secured thereto a connecting rod 22a which extends through a slot 23a formed in a scale dial 23 provided exteriorly of the camera body and is received in a slot 24a formed in a slide lever 24. The slide lever 24 is arranged so that when the self-timer lever 22 is in the position of FIG. 1, the slide lever 24 restrains a key lever 28 (later described) from counter-clockwise rotation, and that when the self-timer lever 22 is rotated in the direction of an arrow A (FIG. 1), the slide lever 24 slides in the direction of an arrow B (FIG. 1) with the aid of the connecting rod 22a, whereby the key lever 28 is released from the restraint imparted thereto. The slide lever 24 provides a slow self-timer member slidably fitted in the base plate 1 and has click grooves formed at locations thereof corresponding to the sliding position for restraining counterclockwise rotation of the key lever 28 and is slidable for releasing such restraint. A click spring 25 has one end thereof secured to the base plate 1 and the other end engaged in one of the click grooves.

The shutter release button interlocking member 26 is slidably mounted on the camera body (not shown) and includes a connecting member 26a for holding the release lever 21, and engaging rod 26b for engaging an operating lever 30 to be described, a projection 26c for engaging the key lever 28, and an operating member 26d for engaging a front curtain retaining lever 31 to be described. The interlocking member 26 is normally biased upwardly by a spring 27.

The key lever 28 provides a key member pivotally supported on the camera body and biased counter-clockwise by a spring 29, and has an engaging rod 28a formed integrally therewith for engaging the operating lever 30. The operating lever 30 is secured to the rotary shaft 15 and arranged so that it is rotated counter-clockwise with a self-timer starting action through cam plate 13, interlocking member 14a and interlocking lever 14 to release the shutter release button interlocking member 26 while rotating the key lever 28 in the clockwise direction.

The front curtain retaining lever 31, formed with a sloped surface 31a, is pivotally mounted on the camera body and normally biased counter-clockwise by a spring 32. The lever 31 is such that the sloped surface 31a thereof is pushed by the operating member 26d of the shutter release button interlocking member 26 in response to the release action of that interlocking member 26 so that the lever 31 is rotated clockwise to release a front curtain starting cam 33.

A support rod 34 is rotatably and slidably supported on the camera body and has fixed thereto a rear curtain retaining lever 36. The support rod 34 is biased downwardly and clockwise (as viewed from above) by a spring 36 and stopped by the operating member 26d of the shutter release button interlocking member 26 on the one hand and by a rotation limiting pin 37 on the other hand. A rear curtain moving pawl 38 and a rear curtain release member 39 for a high speed shutter are arranged in such a manner that the rear curtain retaining lever 35 is kicked off by the projection 39a of the rear curtain release member 39 to release the rear curtain moving pawl 38 from its retained position. A pair of rear curtain pulleys 40 and 40' and a rear curtain drum 41 interposed therebetween are mounted concentrically on a common shaft which has the upper end thereof connected to the pawl 38 and the lower end connected to the front curtain starting cam 33. A shutter release button is provided, as indicated at 42.

With the described arrangement of the prior art, photographing at a super-slow shutter speed may be effected by rotating the self-timer lever 22 for a predetermined amount in the direction of the arrow A in FIG. 1, while rotating the self-timer lever 12 for a desired amount in the direction of the arrow C in FIG. 1. Thus, as shown in FIG. 2, the key lever 28 engages the shutter release button interlocking member 26, and the limit lever 16 is rotated counter-clockwise by the cam plate 13 acting through the interlocking member 14a so that the limit lever 16 is restrained by the retaining pin 18a, while the self-timer lever 12 is restrained from reverse rotation by the ankle 10.

When the shutter release button 42 is then depressed in the direction of arrow D, as shown in FIG. 3, the interlocking member 26 associated therewith slides in the direction of arrow E and acts on the inclined surface 31a to pivot the front curtain retaining lever 31 clockwise to release the front curtain starting cam 33 from its restrained position, thereby allowing the front curtain to start. At the same time, the spring 36 causes the support rod 34 with the rear curtain retaining lever 35 to slide in the direction of an arrow F, thereby retaining the rear curtain moving pawl 38. Also, in response to the sliding movement of the shutter release button interlocking member 26 in the direction of the arrow E, the release lever 21, held by the connecting rod 26a of the interlocking member 26, is rotated in the direction of an arrow G to thereby deflect the spring 18 and disengage the limit lever 16 from the retaining pin 18a while the restraint of the self-timer lever 12 imparted by the ankle 10 via the spring 17 is released to allow the self-timer lever 12 to tick off the time. Simultaneously, the shutter release button interlocking lever 26 has its projection 26c retained by the key lever 28.

Referring to FIG. 3, it will be seen that as the self-timer lever 12 is rotated in the direction of the arrow C' (FIG. 3) in response to the actuation of the self-timer device, the interlocking lever 14 and the operating lever 30 are rotated in the direction of an arrow H by the cam plate 13 through the interlocking member 14a and thus, at the termination of the self-timer operation, the rod 28a and its associated key lever 28 are rotated in the direction of the arrow I, to thereby liberate the shutter release button interlocking member 26. Thereupon, the interlocking member 26 is caused to slide upwardly by the force of the spring 27, while the rear curtain retaining lever 35 is caused to slide upwardly by means of the support rod 34 to thereby liberate the rear curtain moving pawl 38 to allow the rear curtain to move.

Such a time exposure device of the prior art has the disadvantages as noted previously herein, i.e., difficulties in adjusting the timing for starting the release of the front curtain and the release of the self-timer at the same time, and the possible inaccurate exposure which might arise if the shutter button is left depressed and unreleased for a long time, as the case may be.

Figure 6:
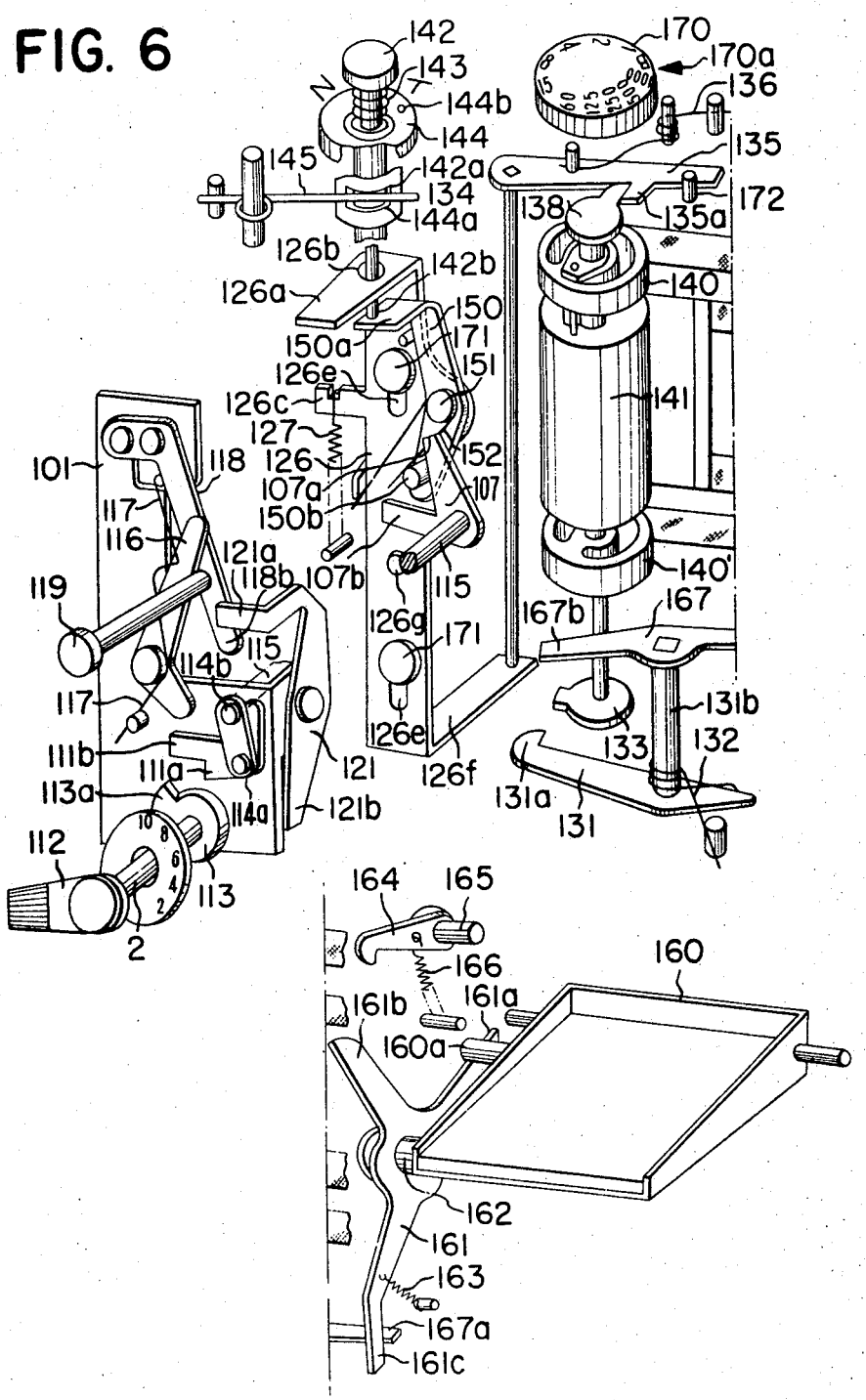
FIG. 6 is a view similar to FIG. 5 and showing the parts in position wherein the self-timer has been charged and the shutter release button depressed.
Figure 7:
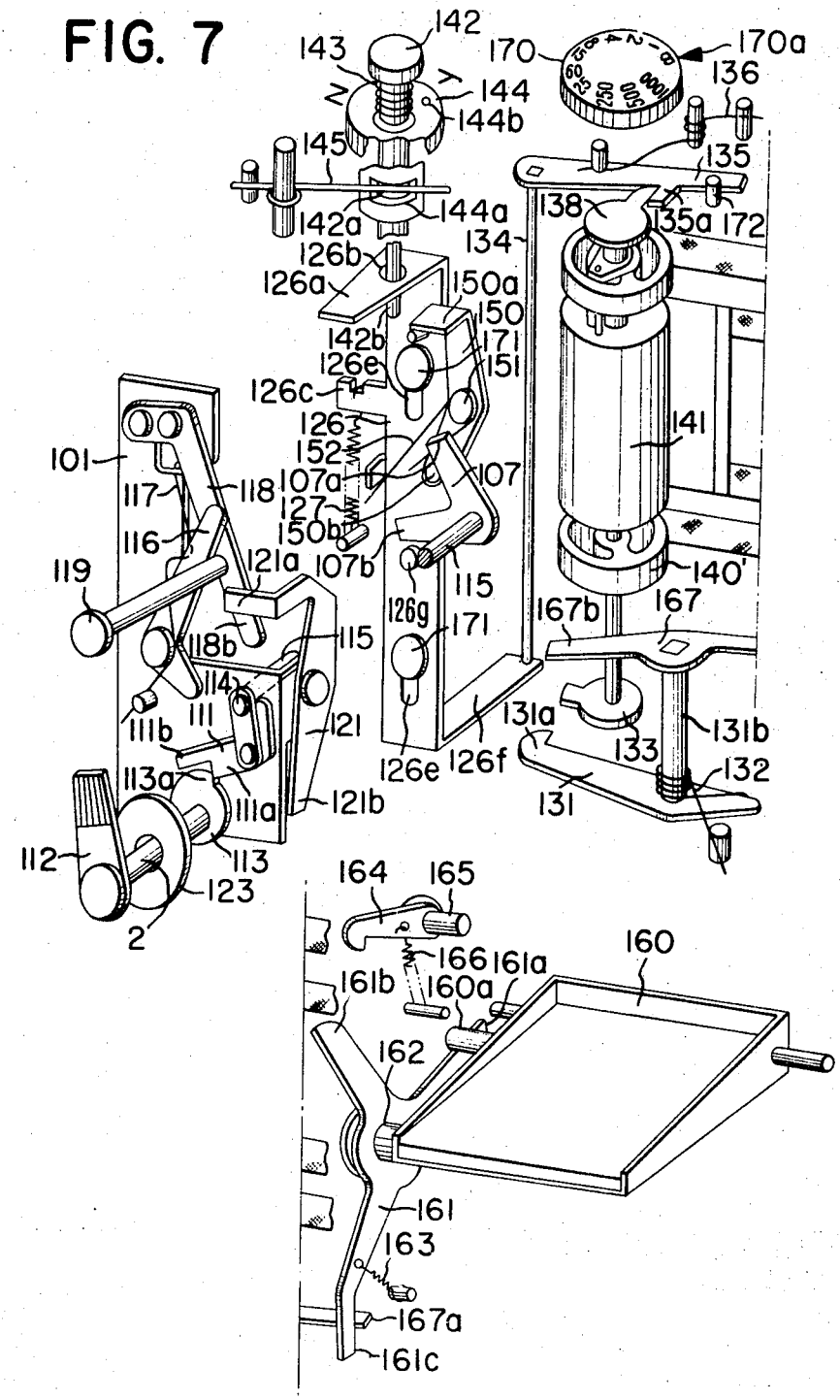
FIG. 7 is a view again similar to FIG. 5, but showing the parts in position immediately before the set time of the self-timer is elapsed.

Referring now to FIGS. 5, 6 and 7, there is shown an example of the time exposure device according to the present invention. Reference numeral 101 designates a base plate secured to a camera body (not shown). Behind the base plate 101, there is provided a mechanism similar to that shown and described with respect to FIG. 4. A self-timer lever 112 and a scale dial 123 are mounted exteriorly of the camera body on a rotary shaft corresponding to the shaft 2 shown in FIG. 4; and a cam plate 113 is mounted on the same shaft, but within the camera body. A lever 114 is secured to one end of a shaft 115 rotatably journalled to the base plate 101, and to the other end of which is connected a shutter release lever 107. At one end of the lever 114, there is pivotally mounted an interlocking member 111 which is associated with the cam plate 113 and with a limit lever 116, which is pivotally mounted on the base plate 101 and biased counter-clockwise by a spring 117. In response to the counterclockwise rotation of the cam plate 113, the limit lever 116 may also be rotated counter-clockwise by means of the interlocking member 111, while the spring 117 will cause the member 11 of FIG. 4 to rotate counter-clockwise to thereby engage the ankle 10 with the escape wheel 9 and restrain the cam plate 113 and accordingly, the self-timer lever 112 from reverse rotation. At this time, the limit lever 126 is restrained from counter-clockwise rotation by the projection 118a of a plate spring 118 secured to the base plate 101.

A start button 119 is secured to the plate spring 118. The start button 119 is arranged so that when it is depressed, the limit lever 116 restrained by the projection 118a of the plate spring 118 is liberated to start the self-timer. A start lever 121 is pivotally mounted on the base plate 101 and, when rotated clockwise, the start lever 121 is adapted to liberate the limit lever 116 from the restraint imparted by the projection 118a. A shutter release button 142, having a groove 142a, is normally biased upwardly, as viewed, by a spring 143. On the shaft of the shutter release button 142, there is mounted a change-over knob 144 which may be changed over between two positions N and T. The change-over knob 144 is formed with an opening 144a and an index mark 144b. A spring 145 is provided in such a manner that when the shutter release button 142 is depressed with the index mark 144b of the change-over knob 144 set to the position T, the spring 145 shifts from the opening 144a into the groove 142a of the shutter release button 142 to restrain the button 142 from being upwardly returned by the spring 143. The change-over knob 144 and the spring 145 thus together constitute a lock means.

A shutter release button interlocking member 126 is provided below the shutter release button 142. It includes an upper tab 126a formed with a hole 126b for receiving the shutter release button 142, and an intermediate portion formed with projections 126d and 126g and slots 126e for receiving pins 171 secured to the camera body. Thus, the interlocking member 126 is vertically slidable due to the cooperation between the slots 126e and the pins 171, and is normally biased upwardly by a compression spring 127 acting against a protrusion 126c formed in the interlocking member 126. The interlocking member 126 is further provided with a lower tab 126f to which is secured a vertical rod 134 for pivotally supporting a rear curtain retaining lever 135 to be described. On the shutter release button interlocking member 126, there is pivotally mounted an auxiliary lever 150, which includes an upper tab 150a and a lower projection 150b, and which is biased counter-clockwise by a spring 152 so that the upper tab 150a is engaged with the lower end 142b of the shutter release button 142. The projection 126d of the interlocking member 126 serves to limit the counter-clockwise rotation of the auxiliary lever 150. Thus, when the shutter release button 142 is depressed, the auxiliary lever 150 and accordingly, the interlocking member 126 connected integrally thereto, may be lowered against the spring force.

The rear curtain retaining lever 135 pivotally supported on top of the rod 134 is biased clockwise by a spring 136 and stopped by a stop pin 172. Adjacent to the lever 135 is a rear curtain moving pawl 138, below which is provided a pair of forward screen pulleys 140 and 140' and a rear curtain drum 141 interposed therebetween. Below the front curtain pulley 140' there is seen a front curtain moving pawl 133 which is adapted to be retained by a front curtain retaining lever 131 when the shutter has been charged. The front curtain retaining lever 131 is normally biased clockwise by a spring 132.

On the righthand side of FIG. 5, there is a mirror 160, adapted to be maintained at a lowered position, as shown, when the shutter has been charged. A mirror driving lever 161 is pivotally mounted on a pin 162 secured to the camera body, and includes arms 161a and 161b, adapted to engage a pin 160a connected to the mirror 160 and a retaining lever 164, to be described, respectively. The mirror driving lever 161 is biased by a spring 163 so that the arm 161a raises the pin 160a when the arm 161b is released from the retaining lever 164, which is pivotally mounted on a pin 165 secured to the camera body and biased downwardly by a spring 166. Although not shown, a mechanism is provided to ensure that the retaining lever 164 retains the mirror driving lever 161 when the shutter has been charged and that the mirror driving lever 161 is liberated from the retention of the retainer lever 164 by the shutter release button interlocking member 126 when the shutter has been released. An interlocking lever 167 is mounted on top of a shaft 131b for the front curtain retaining lever 131 and is adapted to interlock the mirror driving lever 161 with the start lever 121 of the self-timer. A shutter dial for changing over the shutter speed is provided, as indicated at 170, and it has an index mark 170a thereon.

In operation, the shutter dial 170 is first set to a position B in order to effect a long exposure by using the self-timer. Then, the change-over knob 144 is rotated until the index mark 144b thereon comes to the position T. The self-timer lever 112 is rotated in the direction of the arrow J to set the self-timer to a desired time. When the shutter release button 142 is then depressed, the spring 145 shifts from the opening 144a into the groove 142a of the shutter release button 142, as shown in FIG. 6, and the auxiliary lever 150, and accordingly the shutter release button interlocking member 126 integral therewith, are raised so that the projection 135a of the rear curtain retaining lever 135 retains the rear curtain moving pawl 138. At the same time, the mirror driving lever 161, restrained by the retaining lever 164, is liberated from restraint by the interlocking member 126. The mirror driving lever 161 thus liberated allows the mirror 160 to be moved upwardly by the force of the spring 163, and at the final stage of such upward movement of the mirror, the lower end 161c of the mirror driving lever 161 kicks off the corresponding end 167a of the interlocking lever 167. Thus, the interlocking lever 167 is rotated counter-clockwise so that the other end 167b thereof kicks off the lower end 121b of the start lever 121 to thereby start the self-timer, and at the same time, the front curtain retaining lever 131, integrally connected to the interlocking lever 167, is rotated counter-clockwise to liberate the front curtain moving pawl 133 from its retained position. Immediately before the set time of the self-timer is elapsed, the projection 113a of the cam 113 engages and rotates the engaging portion 111a of the interlocking member 111 in the clockwise direction, as shown in FIG. 7. At this time, the shutter release lever 107 is rotated counter-clockwise so that the end 107a thereof engages and rotates the projection 150b of the auxiliary lever 150 in the clockwise direction, whereby the engagement between the lower end 142b of the shutter release button 142 and the upper end 150a of the auxiliary lever 150 is released to allow the shutter release button interlocking member 126 to be raised together with the auxiliary lever 150 by the force of the compression spring 127. Thus, the rear curtain moving pawl 138, restrained by the rear curtain retaining lever 135, is released therefrom to complete the photographing operation.

The end 107b of the shutter release lever 107, which is adjacent to the self-timer, serves to lower the projection 126g of the interlocking member 126 when the self-timer is used in an ordinary manner. For a relatively short exposure, the change-over knob 144 need not be changed over to the position T, and a long exposure may be effected with the shutter release button maintained in depressed position by the finger.

As will be appreciated, according to the present invention, the release of the front curtain and the release of the self-timer are accomplished by the lever adapted to kick up the mirror when the shutter release button has been depressed, and thus the said two release actions can be readily timed with each other without requiring any troublesome adjustment. This results in the provision of a time exposure device which is highly useful for a number of purposes. Furthermore, the device of the present invention is arranged so that even when the shutter button remains depressed, the rear curtain is released with the full lapse of the set time of the self-timer, and this ensures the achievement of accurate exposure to be achieved irrespective of the variable manner in which the shutter button is depressed.

I claim:

1. An apparatus adapted for releasing a shutter driving mechanism of a photographic camera to obtain long exposure time when the camera shutter is set at a B-position comprising
   1. a manually operable shutter release button (142, 143) movable between a first position and a second position;
   2. a manually operable self-timer (101–123) for setting to different times, mounted in said camera;
   3. interlocking means (126,135,150) movable between an upper position in which said shutter driving mechanism remains charged and a lower position in which said shutter driving mechanism starts to be released to start exposure and said self-timer starts;
      said interlocking means being biased toward said upper position and operatively engaged with the shutter release button in such a manner that the interlocking means is moved to the lower position thereof when the shutter release button is moved to the second position thereof,
   4. a second shutter release member (107) mounted in the self-timer to operatively associate with the interlocking means in such a manner that the second shutter release member releases the engagement of the interlocking means, which is in the lower position thereof, with the shutter release button for moving the interlocking means from the lower position into the upper position thereof to complete exposure when the set time of the self-timer is over, whereby exposure time is in accord with the set time of the self-timer.

2. An apparatus as defined in claim 1, wherein said manually operable shutter release button is biased toward the first position.

3. An apparatus as defined in claim 2, further comprising means (145, 144a, 142a) for locking the manually operable shutter release button in the second position thereof.

4. Apparatus according to claim 1 wherein said shutter driving mechanism includes a mirror driving lever, a retaining lever for restraining said mirror driving lever, said interlocking means being mounted to release said retaining lever when moved to its lower position, a front curtain retaining lever, means responsive to movement of said mirror driving lever to start said self-timer and simultaneously release said curtain retaining lever.

5. Apparatus according to claim 1 wherein said interlocking means includes an interlocking member, a rear curtain retaining lever, an auxiliary lever pivotally mounted on said interlocking member and mounted to be engaged by said shutter release button to move said interlocking member to its lower position to retain said rear curtain retaining lever, said second shutter release member being engageable with said auxiliary lever to release said auxiliary lever from the shutter release button to allow the interlocking member to move to its upper position to release said rear curtain retaining lever thereby completing exposure.

* * * * *